United States Patent [19]

Pearce

[11] Patent Number: 5,515,404
[45] Date of Patent: May 7, 1996

[54] DATA COMMUNICATION SYSTEMS

[75] Inventor: David A. J. Pearce, High Wycombe, United Kingdom

[73] Assignee: Madge Networks Limited, Bucks, United Kingdom

[21] Appl. No.: 264,615

[22] Filed: Jun. 23, 1994

[30] Foreign Application Priority Data

Jun. 24, 1993 [GB] United Kingdom ............... 9313020

[51] Int. Cl.$^6$ ............... H04L 7/00; H04L 25/36; H04L 25/40
[52] U.S. Cl. ............ 376/371; 375/376; 327/156; 378/105.3
[58] Field of Search .................... 375/118, 119, 375/120, 371, 372, 373, 376; 370/102, 108, 105.3; 331/25, 57; 445/296, 276.1, 278.1

[56] References Cited

U.S. PATENT DOCUMENTS 3,916,329  10/1975  Hekimian et al. ............... 307/269 X
4,916,411   4/1990  Lymer ............................ 331/25

Primary Examiner—Stephen Chin
Assistant Examiner—Bryan E. Webster
Attorney, Agent, or Firm—Sughrue, Mion, Zinn, Macpeak & Seas

[57] ABSTRACT

A jitter generating device for use in a data communication system. The device has a repeating unit with an input and an output connected in use to receive data from the data communication system and to repeat the data onto the data communication system respectively. A clock signal generator generates a clock signal which is fed to the repeating unit to control the rate at which data is output onto the data communication system. A clock phase (jitter) modulating unit modulates the phase of the clock signal output by the clock signal generator.

6 Claims, 2 Drawing Sheets

DATA COMMUNICATION SYSTEMS

BACKGROUND OF THE INVENTION

The invention relates to data communication systems.

In a data communication system or network, a number of communicating devices are connected together, for example in a ring, and data is passed around the network, the data being in digital form and being generated or regenerated at each device on the network under the control of a local clock. One of the problems which arises is that the clock generated at each device may not be precise and may exhibit a (random) phase variation or jitter. Jitter can be considered as the difference between the phase of a perfectly stable clock at the nominal clock frequency and the clock frequency embedded in the data stream. The jitter amplitude is a measure of how far the phase of the clock embedded in the data stream deviates from the phase of the stable clock; the jitter frequency is a measure of how fast the relative phase changes. Jitter can be defined in several ways, for example in time or frequency domains, and the definition of jitter may vary according to the type of network concerned. In most cases the applicable network standard (such as IEEE 802.5 token ring; ANSI X3T9.5 FDDI. etc) will explain the precise definitions of jitter used in their systems.

When data is received at a device, the device has to be able to decode the data despite the phase jitter which exists. In an existing data communications network it is therefore necessary to measure the jitter tolerance of the network, that is how much jitter the network can tolerate before an error condition will be indicated and data can no longer be reliably decoded.

At present, the jitter tolerance of an installed data communications network can only be determined in terms of the error rate of data frames sent around the network (usually a ring). This technique gives no information about the margins or tolerances present in the network and hence the risk of introducing an unacceptable error rate by extending the network.

During production testing of individual items of data communications equipment, the jitter tolerance is measured by an additional test, which increases test time and requires complex measuring equipment to monitor the bit error rate of the equipment under test. Furthermore, in the particular case of communications systems based on a chain of repeaters, for example a ring-based local area network, the jitter is not due simply to the individual items of data communications equipment but is a complex function also of the properties of the installed cable and is practically impossible to predict from measurements made on the individual network components.

SUMMARY OF THE INVENTION

In accordance with one aspect of the present invention, we provide a jitter generating device for use in a data communication system, the device having a repeating unit with an input and an output connected in use to receive data from the data communication system and to repeat the data onto the data communication system respectively; a clock signal generator for generating a clock signal which is fed to the repeating unit to control the rate at which data is output onto the data communication system; and a clock phase (jitter) modulating unit for modulating the phase of the clock signal output by the clock signal generator.

In contrast to the known approaches to monitoring jitter, which rely on simply detecting the jitter which arises normally, we have realized that a significant improvement can be obtained by positively generating controlled jitter into the system. To that end, we have developed a jitter generating device which can be used to act as a repeater in a conventional data communication system or in some circumstances can be used to test individual items of data communications equipment. The reference to a data communication system should therefore be understood not only to relate to a system having a number of data communication equipments but to a very simple system comprising a single piece of data communication equipment.

Typically, the clock signal generator comprises a phase locked loop, the output clock signal being a function solely of the inherent clock of the phase locked loop and the clock phase modulating unit. However, in a preferred example, the clock signal generator further comprises an adder for receiving a signal relating to the phase jitter of the incoming data clock and for receiving the output from the clock phase modulating unit so as to add these signals together and feed the result to the phase locked loop.

Although the clock phase modulating unit could generate a constant modulation in some predetermined manner, preferably the unit is responsive to a control signal input to vary the modulation.

This latter aspect is particularly useful when the device is incorporated into a data communication system, the system comprising one or more data communication devices linked together for data communication therebetween and including at least one jitter generating device according to the invention for repeating the data which it receives from the system back into the system, the system further comprising monitoring means for monitoring the condition of data passing around the system and for controlling the clock phase modulating unit of the jitter generating device in response to the monitored error conditions.

This allows automatic monitoring of the data communication system to be achieved with the monitoring means controlling the clock phase modulating unit of the jitter generating device.

Typically, the control means will increase the amount of jitter generated by the clock phase modulating unit until an unsatisfactory error rate is monitored thus indicating the jitter tolerance of the system. There are two ways in which the increase could be achieved; either by increasing the duty-cycle of the (typically square-wave) clock signal (and hence modifying the length frequency step in the local clock) or by increasing the amplitude of the clock signal and hence modifying the size of the frequency step. Usually, it is the size of the frequency step that would be altered.

BRIEF DESCRIPTION OF THE DRAWINGS

An example of a jitter generating device and a data communication system incorporating such a device will now be described with reference to the accompanying drawings, in which.

DETAILED DESCRIPTION OF THE PREFERRED EMBODIMENT

Figure 1:
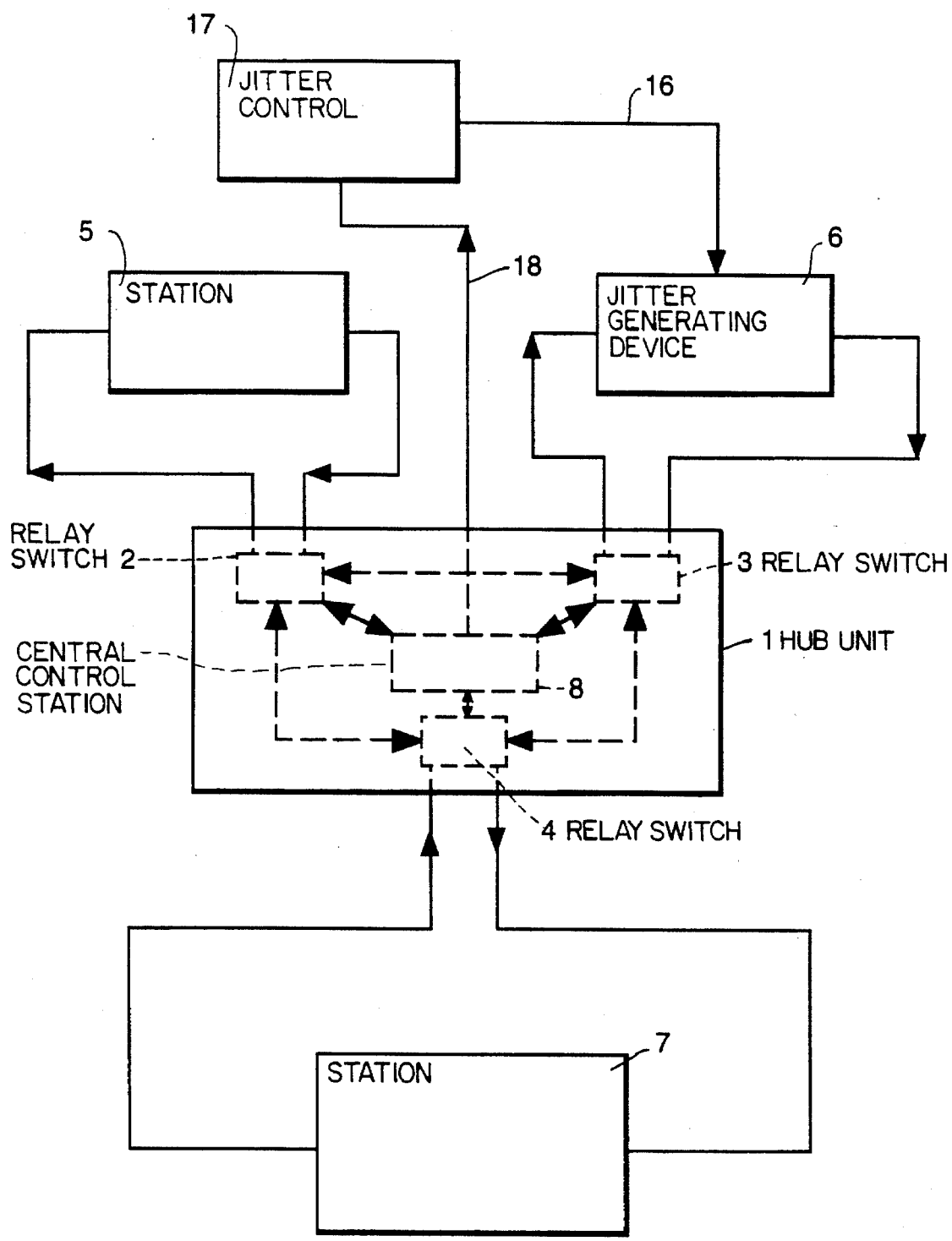
FIG. 1 is a block diagram of the data communication system.

The data communication system shown in FIG. 1 is a local area network in the form of a ring which, for example implements a token ring protocol. The system comprises a hub unit 1 having, in this case, three relay switches 2–4, each communicating in a conventional manner with a station 5, a device 6 and a station 7 respectively. The relay switches 2–4 are connected in a ring, as shown, and can be controlled to selectively include the units 5–7 into a data communication ring. Control of the relay switches and monitoring of the flow of data around the ring is achieved by a central control system 8.

Figure 2:
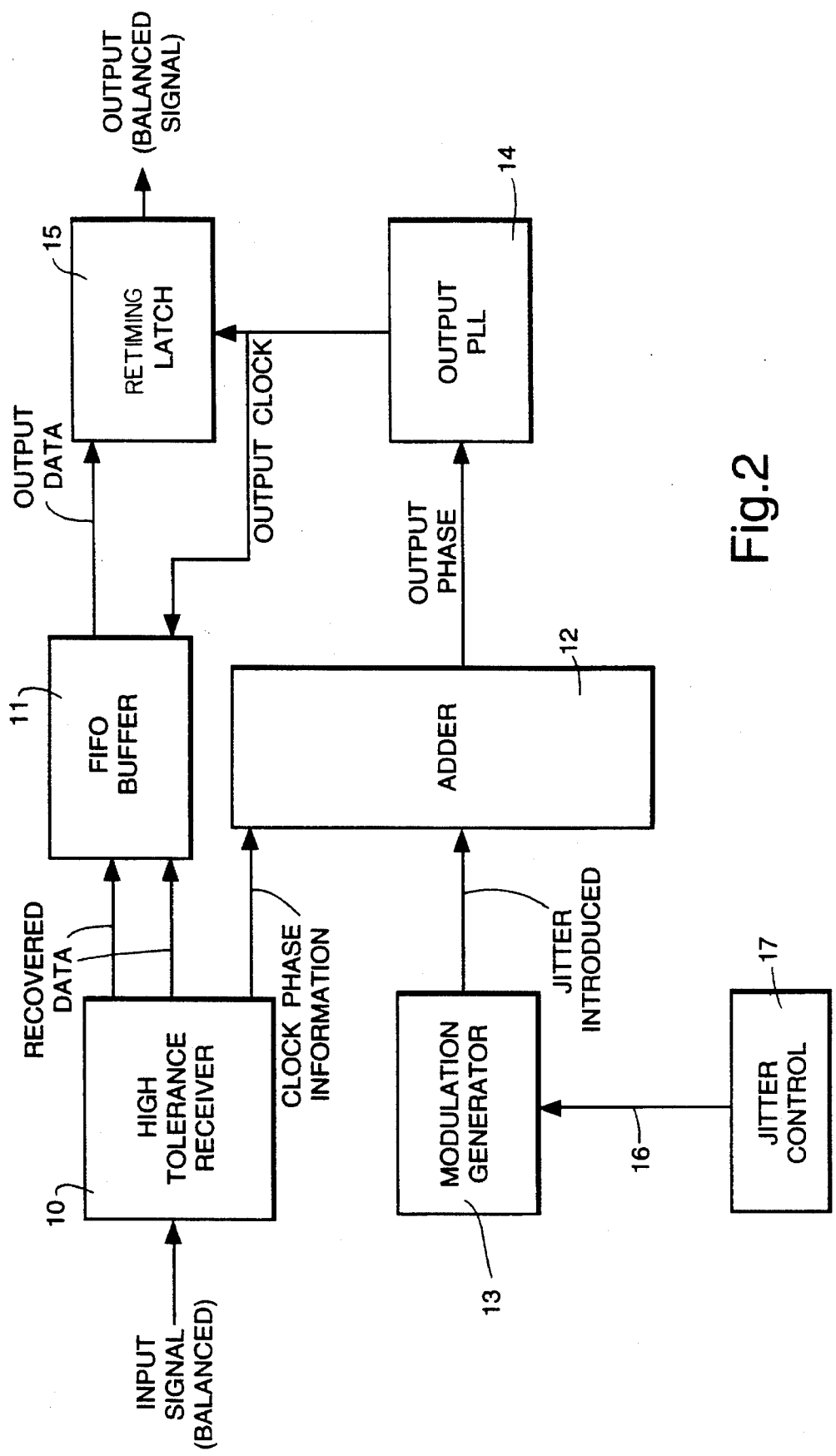
FIG. 2 is a block diagram of the jitter generating device shown in FIG. 1.

The stations 5, 7 may be of any conventional form such as computers or other data processing devices. The device 6, however, is a jitter generating device which is shown in more detail in FIG. 2. The device shown in FIG. 2 comprises a high tolerance receiver 10 which receives the data input signal from the relay 3 with a negligible error rate and derives a clock signal from this data stream. The data recovered by the receiver 10, under the control of the recovered clock is clocked into a FIFO buffer 11. Information about the clock phase jitter in the incoming data is sent to an adder 12 which combines this information with the output from a clock phase modulation generator 13. The sum of these signals is then used by an output phase locked loop (PLL) 14 to generate a clock which is fed to a retiming latch 15. The retiming latch 15 receives data from the FIFO buffer 11 so that this data is then retimed before being output from the device 6 back to the relay switch 3. Thus, the jitter in the output data stream is the sum of the jitter present in the input data stream and the jitter introduced by the modulation generator 13.

The amplitude and frequency of the jitter generated by the modulation generator 13 is controlled by a jitter control system 17 via an input 16. The amount of jitter introduced will typically be monitored by calibrating the jitter generating device 6 so that a known input from input 16 will always produce a known amount of jitter. Alternatively, it may be monitored by an independent jitter monitoring device. The effects of the jitter will typically be detected by one of the stations 5,7 as a corrupted frame. The jitter control system 17 causes the modulation generator 13 progressively to increase the amount of jitter introduced while central control system 8 monitors errors in the stations 5,7 in a conventional manner and until data on the ring is corrupted, as detected by a corrupted frame. The jitter tolerance of the data communication system can then be measured. A set of results of error rate for various types and amplitudes of incoming jitter can be used to characterize the jitter tolerance of a network.

Typically, the device 6 will be placed immediately after a transmitting station so that the effects on the initial system state are minimised.

The modulation generator 13 can be used to introduce any sort of phase modulation. In a typical data communication system the output modulation will take the form of a sinewave of adjustable depth and frequency. In the particular case of a system comprising a chain of repeaters such as a token ring system, the preferred output from the modulation generator 13 would consist of a square wave of adjustable depth. This is because in the particular case of networks based on a chain of repeaters, the worst case for jitter build-up often takes the form of a temporary rise (or fall) in the frequency of the clock at each station. As more stations are added to the ring, the magnitude of this rise or fall in frequency does not change, however the period during which the frequency is offset from the nominal increases linearly with the number of nodes. To artificially generate this form of jitter requires a square-wave modulation; in contrast to the sinewave modulation more commonly used to specify and test point-to-point communication links where there is no build-up of the jitter through a chain of repeaters.

In some cases, the adder 12 may not use the information about the phase of the received signal, but merely pass on the output of the modulation generator 13 to the output PLL 14. In this case any jitter in the input signal is absorbed within the FIFO buffer 11, and the jitter in the output data is entirely that introduced by the modulation generator 13. A typical use of this mode would be where two jitter generating devices are used on either side of a component in a ring. The first device is set to generate additional jitter which the second device will absorb. In this way the jitter tolerance of a single unit, or section of the network can be determined.

In some cases, a low frequency feedback signal from the FIFO buffer to the output PLL 14 will be required to prevent the FIFO buffer from overflowing. The low frequency feedback signal from the FIFO can be used to ensure that over the long term, the FIFO tends to be half-full. If this signal is at a low-enough frequency, it will not disturb the frequency response of the output PLL; however, it will allow the test gear to automatically achieve the ideal operating point i.e. where the FIFO is half-full.

During testing, the device can be included in the data path used to test the functional operation of the equipment, and a preset amount of jitter introduced into the signal received by the equipment. Any errors reported by the unit during its functional test can be used as an indication that the jitter tolerance of the sample unit is unsatisfactory.

I claim:

1. A jitter generating device for use in a data communication system, the device having means with an input and an output connected to receive data from the data communication system and to repeat the data onto the data communication system respectively; a clock signal generator, connected to the means to receive and to repeat data, for generating a clock signal which is fed to the means to receive and to repeat data to control the rate at which data is output onto the data communication system; and a clock phase (jitter) modulating unit, connected to the clock signal generator, for modulating the phase of the clock signal output by the clock signal generator, wherein the clock signal generator includes an adder for adding the output of the clock phase modulating unit to a signal representing the jitter already existing on data input to the device.

2. A device according to claim 1, wherein the clock signal generator is a phase locked loop.

3. A jitter generating device for use in a data communication system, the device having means with an input and an output connected to receive data from the data communication system and to repeat the data onto the data communication system respectively; a clock signal generator, connected to the means to receive and to repeat data, for generating a clock signal which is fed to the means to receive and to repeat data to control the rate at which data is output onto the data communication system; and a clock phase (jitter) modulating unit, connected to the clock signal generator, for modulating the phase of the clock signal output by the clock signal generator, wherein the clock phase modulating unit variably modulates the phase of the clock signal.

4. A device according to claim 3, wherein the clock phase modulating unit is responsive to a control signal input to vary the modulation.

5. A data communication system comprising one or more data communication devices linked together for data communication therebetween and including at least one jitter generating device having means with an input and an output connected to receive data from the data communication system and to repeat the data onto the data communication system respectively; a clock signal generator, connected to the means to receive and to repeat data, for generating a clock signal which is fed to the means to receive and to repeat data to control the rate at which data is output onto the data communication system; and a clock phase (jitter) modulating unit, connected to the clock signal generator, for modulating the phase of the clock signal output by the clock signal generator, wherein the clock phase modulating unit variably modulates the phase of the clock signal, the jitter generating device repeating the data which it receives from the system back into the system, the system further comprising monitoring means for monitoring the condition of data passing around the system and for controlling the clock phase modulating unit of the jitter generating device in response to the monitored error conditions, wherein the control means increases the amount of jitter generated by the clock phase modulating unit until an unsatisfactory error rate is monitored thus indicating the jitter tolerance of the system.

6. A data according to claim 5, wherein the devices are linked in a ring.

* * * * *